Figure 1:
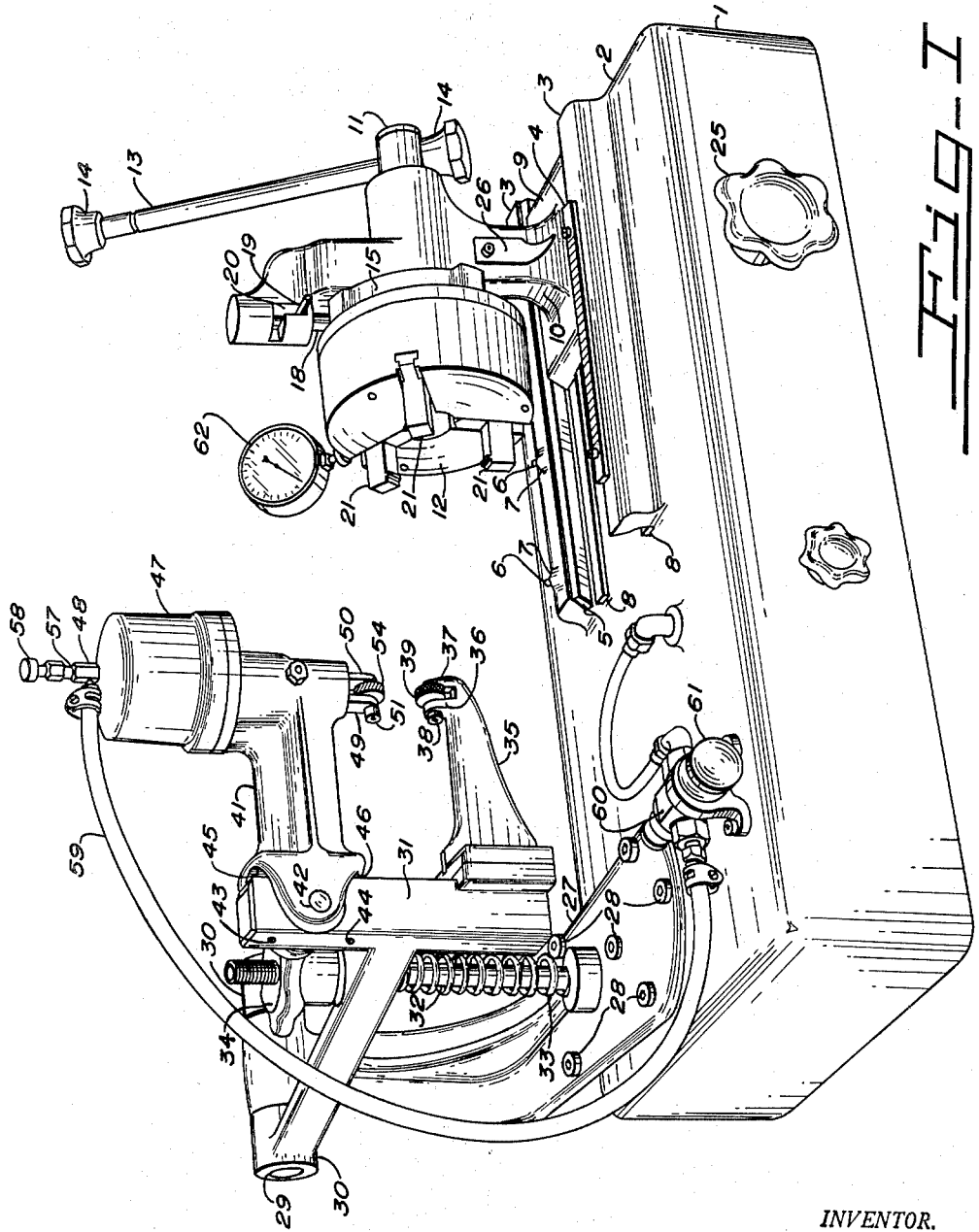

May 1, 1956     E. W. TILLIS     2,743,630
PISTON RECONDITIONING DEVICES

Filed Sept. 4, 1952     2 Sheets-Sheet 1

INVENTOR.
EARL W. TILLIS
BY
Marshall, Marshall & Yeasting
ATTORNEYS

May 1, 1956     E. W. TILLIS     2,743,630
PISTON RECONDITIONING DEVICES
Filed Sept. 4, 1952     2 Sheets-Sheet 2
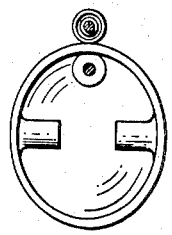
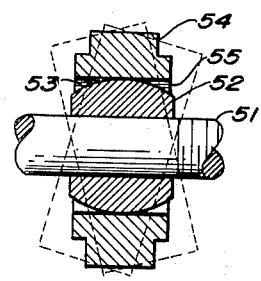
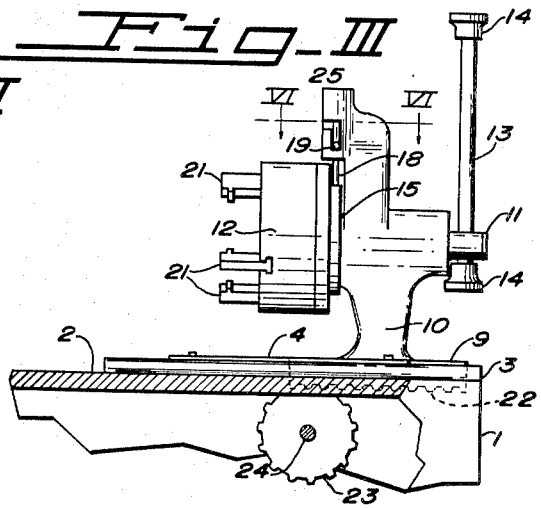
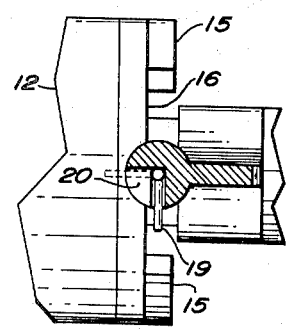
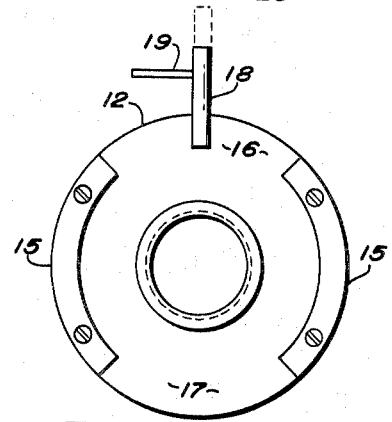
INVENTOR.
EARL W. TILLIS
BY
Marshall, Marshall & Yeasting
ATTORNEYS

United States Patent Office 2,743,630
Patented May 1, 1956

2,743,630

PISTON RECONDITIONING DEVICES

Earl W. Tillis, Elkhart, Ind.

Application September 4, 1952, Serial No. 307,791

6 Claims. (Cl. 80—5.1)

This application is a continuation in part of my application Serial No. 268,624, filed January 28, 1952, now Patent No. 2,668,462 issued February 9, 1954.

This invention relates to automobile servicing equipment and particularly to devices for reconditioning automobile engine pistons.

An automobile engine piston comprises a circular body having a closed flat or concave top and a skirt which depends from the circular body. The circular body is made slightly smaller in diameter than the bore of the cylinder within which it is to reciprocate, so that it will not seize or bind in the cylinder even when it is expanded by heat, and it is provided with peripheral grooves which receive split piston rings that expand resiliently to conform closely to the cylinder wall.

The piston is connected to the engine crank shaft by means of a connecting rod having its lower end journaled on a crank pin and its upper end pivoted to the piston body by means of a wrist pin. As the piston reciprocates up and down and the connecting rod pivots from side to side on the wrist pin the piston is prevented from rocking or tilting within the cylinder by the piston rings which guide the upper end of the piston and the skirt which guides the piston's lower end. The skirt therefore is made to fit closely against the right and left sides of the cylinder bore, though it need not fit closely against the front or back. This close fit against the sides is sometimes accomplished by making the skirt slightly oval.

The side thrust created by the pressure of the products of combustion against the angularly positioned connecting rod, and by the inertia of the piston itself as it accelerates and decelerates, causes wear of the engaging surfaces. The piston skirt may be sufficiently resilient to take up some wear, but the necessity for avoiding excessive friction when the engine is new limits the degree of resilient expansion for which the skirt may properly be designed.

Eventually the sides of the skirt wear down, the skirt becomes loose and so called "piston slap" makes the engine noisy and inefficient.

It is an object of this invention to provide improved means for restoring the lateral dimensions of piston skirts which have been reduced by wear.

More specifically it is an object of this invention to provide improved means for creating protuberances on the surfaces of piston skirts that have been worn down.

A further object is to provide improved means for grouping such protuberances in bands extending partially around the piston skirts at the locations of greatest wear.

A further object is to provide a device capable of forming such bands on piston skirts of various sizes and having various interior contours and various hardness characteristics, and another object is to provide means for raising the protuberances of such bands to substantially equal heights in all areas of the bands.

Another object is to provide a machine having a rugated roller and fluid pressure means to force said rugated roller against the exterior of a piston skirt, a backing roller adapted to engage the interior of a piston skirt and means for so mounting said rugated roller and said backing roller that such fluid pressure will move said backing roller into backing engagement with such piston skirt.

Another object is to so construct the means for mounting said rugated knurling roller and said backing roller that such fluid pressure will be effective to bring them into proper engagement with piston skirts of various sizes and will permit them to remain in pinching engagement with such skirt even though the exterior of such skirt be non-circular and/or eccentric and the contour of the interior of such piston skirt be irregular.

Other objects and advantages will be apparent from the following detailed description as illustrated by the accompanying drawings in which:

Figure I is a view in perspective of a machine embodying the instant invention.

Figure II is a view in section through the knurling roller and a universal mounting therefor.

Figure III is an elevational view of piston holding mechanism with a part of the base of the machine shown in section to depict the manner in which the piston holding mechanism is mounted thereon.

Figure IV is an end elevation of a piston showing the oval shape of the skirt as somewhat exaggerated and showing the skirt as pinched between rollers.

Figure V is an enlarged end elevational view of the piston holding element of the machine showing arcuate stops to limit the rocking movement of the element.

Figure VI is a fragmentary plan view partly in section of the element illustrated in Figure V showing it mounted in juxtaposition to a pin positioned to engage the arcuate stops.

The base 1 of the machine is shown as hollow and rectangular, having a substantially flat top 2 upon which a pair of ways 3 is integrally formed. One of the ways 3 is provided with a graduated scale 4. The other way 3 is lined with a bearing strip 5 which may be adjusted into parallelism and further adjusted when necessary to compensate for wear by means of screws 6 which are threaded through lugs 7 projecting from the way. Stationary horizontal bearing strips 8 are welded upon the top 2 between the ways 3.

Mounted for free sliding movement between the ways 3 is a plate 9 upon which is erected a stand 10, and journaled in the stand is a rock shaft 11 having fixed upon one of its ends a piston holding element in the form of a chuck 12. Extending through the other end of the rock shaft 11 is a handle 13 that is provided with knobs 14 by means of which the rock shaft and the parts carried thereby may be rocked. The chuck 12 has fixed thereto a pair of arcuate stops 15, the ends of which are angularly spaced as at 16 and 17, and projecting into the space 16 is a pin 18 that is vertically slidably mounted on the stand 10. A finger piece 19 is fixed to the pin 18 and extends outwardly through an opening 20 to facilitate manipulation of the pin 18.

The chuck 12 is provided with gripping elements 21 which are moved radially and in unison by well known chuck mechanism (not shown) to grip the body of the piston.

The plate 9 is provided with a rack 22 which meshes with a pinion 23 that is fixed upon a shaft 24 which may be turned by means of a hand wheel 25 located on the front side of the base 1. A pointer 26 fixed to the stand 10 cooperates with the graduated scale 4 to indicate the position to which the plate 9 and the parts carried thereby have been moved by turning the hand wheel 25.

A shaft support 27 is secured at one end to the top 2 of the base 1 adjacent its left end by means of bolts and nuts 28 and passing through the other end of the shaft support 27 is a shaft 29 upon the ends of which are mounted bearings 30 of a pivoted frame 31.

A post 32 having its lower end fixed to the shaft support 27 extends vertically through an opening in the pivoted frame 31 and surrounding the post 32 is an expansive spring 33 which tends to swing the pivoted frame upwardly, such upward movement being limited by a hand nut 34 threaded upon the upper end of the post 32 which projects above the pivoted frame 31.

The expansive spring 33 reacts against the frame with sufficient force to hold it against the hand nut 34 but the strength of the spring is such that the frame can be pushed downward by hand.

A bracket 35 fixed to the pivoted frame 31 extends horizontally toward the chuck 12 and is fashioned with a pair of upstanding ears 36 and 37 and extending between the ears 36 and 37 is an axle 38 which carries a backing roller 39.

An arm 41 is attached to the upper end of the pivoted frame 31 by a pintle 42 and is angularly adjustable upon the pintle by means of set screws 43 and 44 which are threaded into the pivoted frame 31 for engaging shoulders 45 and 46 on the arm 41. Fixed upon the arm 41 is a cylindrical chamber 47 within which reciprocates a plunger (not shown). Fluid, such as air, admitted under pressure through a fitting 48 into the upper end of the cylindrical chamber 47 forces the plunger down, while a spring serves to lift the plunger in a manner which is well known when the fluid pressure is relieved.

The plunger extends downwardly through a vertical bore in the arm 41 and has a pair of ears 49 and 50 formed upon its lower end. Extending between the ears 49 and 50 is an axle 51 which carries a bushing 52 the outer surface 53 of which is shaped like the equatorial zone of a sphere. (See Fig. II.) Mounted upon the bushing 52 for universal pivotal and rotatable movement thereon is a rugated knurling roller 54 having a cylindrical bore 55 engaging the spherical surface 53. This universal mounting makes the knurling roller 54 self adjusting as to its position when pressed against the surface of a piston. Uniformity of knurling done by the knurling roller thus is assured.

The fitting 48 may be provided with a valve, the stem 57 of which is equipped with a head 58. A flexible hose 59 is attached to the fitting 48 and extends therefrom to a pressure control unit 60 having a knob 61 by means of which air or other fluid may be admitted to or released from the cylindrical chamber 47 to provide any desired pressure. The control unit may be of any suitable construction and will not be described in detail herein. The machine may be equipped with a pressure gauge 62 to indicate the fluid pressure available for the machine's operation.

Operation

When it is desired to process a piston the piston is clamped in the jaws 21 of the piston holder 12 with the wrist pin sockets horizontal and the handle 13 extending vertically. The hand wheel 25 then is turned to move the piston skirt to a position surrounding the backing wheel 39, the pivoted frame being pushed downwardly sufficiently to permit the piston skirt to move over the backing wheel. The knob 61 of the pressure control unit 60 is manipulated to admit pressure to the cylindrical chamber 47. The pressure pushes the plunger downwardly until the roller 54 engages the piston skirt. Since the upward pressure on the cylindrical chamber 47 is equal to the downward pressure on the plunger, the backing roller 39 is pulled upwardly with a force equal to the downward force exerted on the knurling roller 54. Thus the piston skirt is squeezed between the backing roller and the knurling roller, but there is no tendency to push the piston skirt bodily downward. As the knurling roller 54 is forced against the theretofore smooth surface of the piston skirt, its rugations sink into the smooth surface and cause the material of the piston skirt to flow upwardly into the interstices between the rugations on the knurling roller. The operator then rocks the piston to and fro, thus forming a series of protuberances, which may be knolls or ridges, the pattern of which is in conformity with the pattern of the rugations on the knurling roller.

Since the pivoted frame 31 "floats" on its bearings, the rollers can move together bodily to conform to non-circularity or eccentricity of the piston skirt, and since the rollers can be forced away from each other against the fluid pressure, the backing roller 39 can ride over ribs or other thickened portions of the piston skirt.

By releasing the pressure and turning the knob 25 to advance the piston holder to new positions, additional bands of protuberances may be raised upon the surface of the skirt. When the piston has been knurled on one side, the pin 18 may be retracted by means of the finger piece 19, the piston holder turned through 180° and the processing repeated on the opposite side of the piston skirt.

Having described the invention, I claim:

1. In a piston knurling machine, in combination, a knurling roller, said knurling roller having a cylindrical bore, a bearing having an exterior surface shaped like the equatorial zone of a sphere, said bearing being received in the cylindrical bore of said knurling roller and supporting said knurling roller for universal tilting movement said knurling roller being freely rotatable on said bearing, and means yieldably supporting said bearing for limited up and down movement.

2. In a piston knurling machine, in combination, means for gripping the closed end of a piston, a knurling roller, a backing roller, a bearing having a spherical surface for supporting said knurling roller for universal tilting movement said knurling roller being freely rotatable on said bearing exteriorly of the skirt of such piston, means for supporting said backing roller interiorly of such skirt, the means for supporting said bearing and the means for supporting said backing roller both being carried by a common carrier, means for yieldably mounting said carrier for limited up and down movement, means for forcing said knurling roller and said backing roller toward each other and means for rocking said means for gripping the closed end of such piston to move such skirt between said knurling roller and said backing roller, whereby a band of protuberances is formed upon the exterior of such skirt.

3. In a piston knurling machine, in combination, means for gripping the closed end of a piston, a knurling roller, a backing roller, a bearing having a spherical surface for supporting said knurling roller for universal tilting movement exteriorly of the skirt of such piston, said knurling roller being freely rotatable on said bearing means for supporting said backing roller interiorly of such skirt, the means for supporting said bearing and the means for supporting said backing roller both being carried by a common carrier, means for yieldably mounting said carrier for limited up and down movement, means for forcing said knurling roller and said backing roller toward each other, means for rocking said means for gripping the closed end of such piston to move such skirt between said knurling roller and said backing roller, whereby a band of protuberances is formed upon the exterior of said skirt, means for limiting the rocking movement of said gripping means and means for selectively positioning said limiting means.

4. In a knurling roller, in combination, means for gripping the closed end of a piston, a knurling roller, a backing roller, a bearing having a spherical surface for supporting said knurling roller for universal tilting movement exteriorly of the skirt of such piston, said knurling roller being freely rotatable on said bearing means for supporting said backing roller interiorly of such skirt, the means for supporting said bearing and the means for supporting said backing roller both being carried by a common carrier, means for yieldably mounting said carrier for limited up and down movement, means for forcing said knurling roller and said backing roller toward each other, means for rocking said means for gripping the closed end of such piston to move such skirt between said knurling roller and said backing roller, whereby a band of protuberances is formed upon the exterior of said skirt, and means for regulating the force urging said knurling roller and said backing roller toward each other.

5. In a piston knurling machine, in combination, a stationary base, a stand supported upon said base, a chuck supported upon said stand and having means for gripping the closed end of a piston, means for rocking said chuck about the cylindrical axis of such piston, a support fixed to said base, a frame pivotally mounted on said support, a knurling roller and a backing roller carried by said frame, means for effecting relative movement of said stand and said frame to locate a piston carried by said chuck with its skirt between said knurling roller and said backing roller, means for forcing said knurling roller and said backing roller toward each other whereby when said chuck is rocked about the cylindrical axis of such piston a band of protuberances is formed upon the exterior of such skirt, said knurling roller being mounted for universal tilting and rotation of said knurling roller.

6. In a piston knurling machine, in combination, a base, means for supporting a piston above said base for rocking movement about such piston's cylindrical axis, a frame mounted above said base for pivotal movement about an axis substantially parallel to the cylindrical axis of such piston, a knurling roller and a backing roller carried by said frame and means for forcing said knurling roller and said backing roller toward each other, said knurling roller being mounted on a bearing having a surface shaped like the equatorial zone of a sphere to permit universal tilting of said knurling roller said knurling roller being freely rotatable on said bearing.

References Cited in the file of this patent
UNITED STATES PATENTS

| | | |
|---|---|---|
| 2,083,775 | Carroll | June 15, 1937 |
| 2,593,887 | Jones | Apr. 22, 1952 |
| 2,593,936 | Teetor | Apr. 22, 1952 |